(12) United States Patent
Boyd et al.

(10) Patent No.: US 8,386,537 B2
(45) Date of Patent: Feb. 26, 2013

(54) METHOD FOR TRIMMING DATA ON NON-VOLATILE FLASH MEDIA

(75) Inventors: James A. Boyd, Hillsboro, OR (US); Knut S. Grimsrud, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 277 days.

(21) Appl. No.: 12/638,496

(22) Filed: Dec. 15, 2009

(65) Prior Publication Data

US 2011/0145306 A1 Jun. 16, 2011

(51) Int. Cl.
*G06F 17/30* (2006.01)
(52) U.S. Cl. .......................... 707/821; 707/822; 707/824
(58) Field of Classification Search .................. 707/821, 707/822, 824
See application file for complete search history.

(56) References Cited

U.S. PATENT DOCUMENTS

| | | | |
|---|---|---|---|
| 8,015,300 B2 * | 9/2011 | Takeda | 709/227 |
| 2009/0235245 A1 * | 9/2009 | Andersson | 717/172 |
| 2009/0249222 A1 * | 10/2009 | Schmidt et al. | 715/751 |
| 2010/0125588 A1 * | 5/2010 | Mehra et al. | 707/754 |
| 2010/0125705 A1 * | 5/2010 | Mehra et al. | 711/114 |
| 2010/0125714 A1 * | 5/2010 | Mehra et al. | 711/166 |
| 2010/0325352 A1 * | 12/2010 | Schuette et al. | 711/103 |
| 2011/0271037 A1 * | 11/2011 | Oh et al. | 711/103 |

* cited by examiner

*Primary Examiner* — Baoquoc N To
(74) *Attorney, Agent, or Firm* — Chapin IP Law, LLC

(57) ABSTRACT

A method for trimming data on non-volatile flash media is generally presented. In this regard, in one embodiment, a method is introduced comprising allocating a temporary file that occupies free space on a flash memory, determining specific blocks of the flash memory that the temporary file occupies, generating TRIM commands for the specific blocks, and deleting the temporary file. Other embodiments are described and claimed.

14 Claims, 2 Drawing Sheets

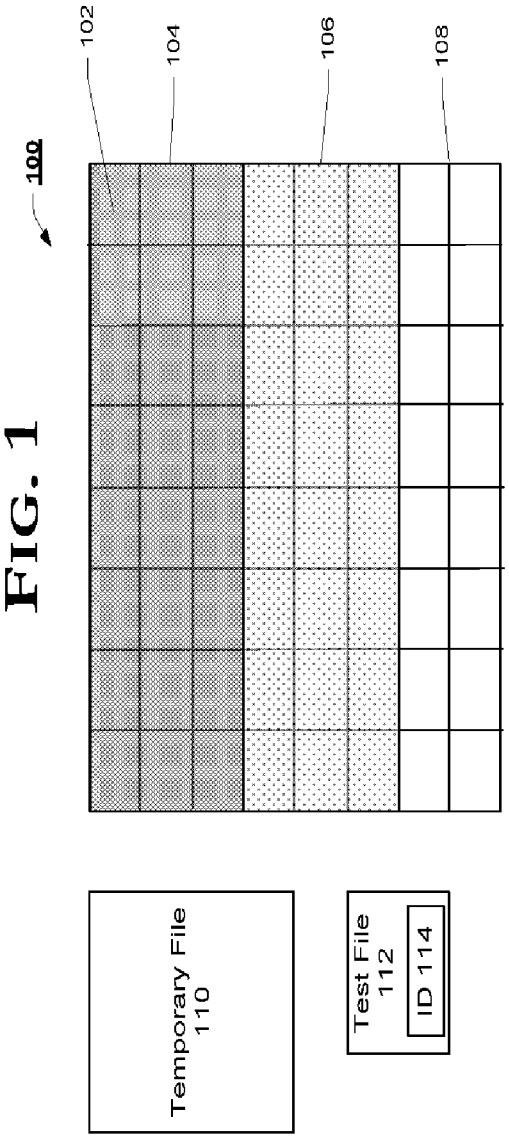
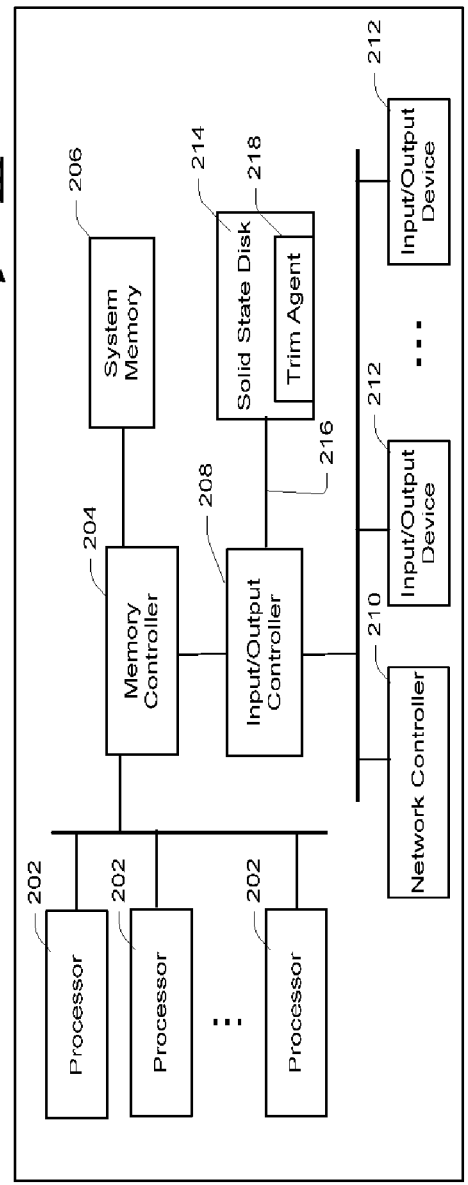

US 8,386,537 B2

METHOD FOR TRIMMING DATA ON NON-VOLATILE FLASH MEDIA

FIELD OF THE INVENTION

Embodiments of the present invention generally relate to the field of data storage, and, more particularly to a method for trimming data on non-volatile flash media.

BACKGROUND OF THE INVENTION

Flash memory is being used more frequently for data storage in computing devices and in some cases is replacing a traditional hard disk drive. Data stored in flash memory that an operating system (OS) "deletes" and considers available space may actually be maintained in the flash memory potentially lowering performance. A Trim operation has been standardized by Technical Committee T13 providing a way to instruct flash memory devices about which logical addresses for which it no longer has to maintain an active logical to physical address mapping.

BRIEF DESCRIPTION OF THE DRAWINGS

The present invention is illustrated by way of example and not limitation in the figures of the accompanying drawings in which like references indicate similar elements, and in which:

FIG. 1 is a graphical illustration of an example flash memory, in accordance with one example embodiment of the invention;

FIG. 2 is a block diagram of an example electronic appliance suitable for implementing disclosed methods, in accordance with one example embodiment of the invention;

DETAILED DESCRIPTION

Figure 3:
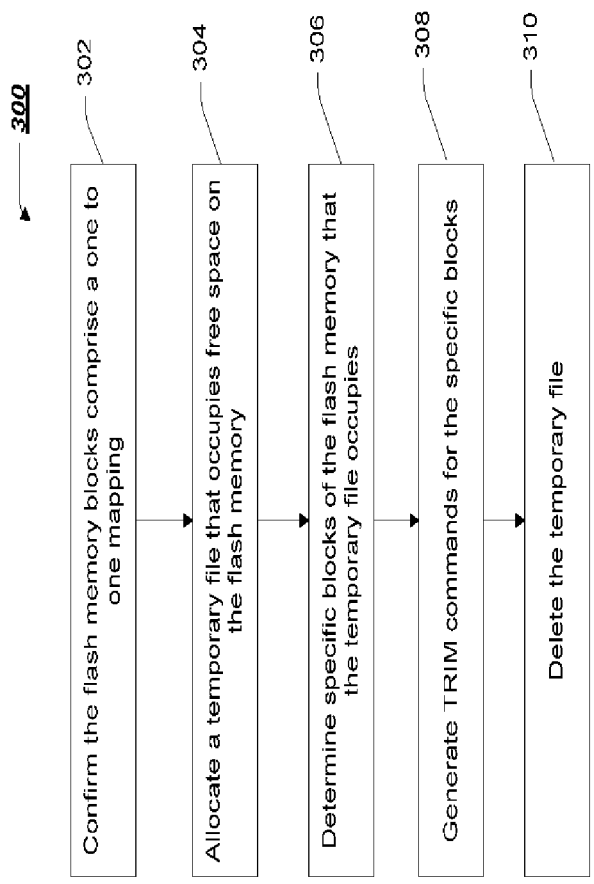
FIG. 3 is a flow chart of an example method for trimming data on non-volatile flash media, in accordance with one example embodiment of the invention.

In the following description, for purposes of explanation, numerous specific details are set forth in order to provide a thorough understanding of the invention. It will be apparent, however, to one skilled in the art that embodiments of the invention can be practiced without these specific details. In other instances, structures and devices are shown in block diagram form in order to avoid obscuring the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

FIG. 1 is a graphical illustration of an example flash memory, in accordance with one example embodiment of the invention. In accordance with the illustrated example embodiment, filesystem memory 100 may include one or more logical blocks 102. While shown as including 64 logical blocks 102, filesystem memory 100 may have any number of blocks. As shown, filesystem memory 100 may include allocated filesystem blocks 104 (which may contain active data), deleted filesystem blocks 106 (which may contain data that has been deleted), and unallocated filesystem blocks 108 (which may contain no data). In one embodiment, filesystem memory 100 comprises NAND flash memory, such as in a solid state disk or hard disk drive cache. In one embodiment, an available free space of filesystem memory 100 includes both deleted filesystem blocks 106 and unallocated filesystem blocks 108. While shown as being continuous regions, allocated filesystem blocks 104, deleted filesystem blocks 106 and unallocated filesystem blocks 108 may be discontinuous.

Temporary file 110 may be created and allocated space in filesystem memory 100 as part of a method for trimming data on filesystem memory 100, for example as described in relation to FIG. 3.

Test file 112 may be created as part of a method for confirming logical blocks 102 are not remapped, for example as described in relation to FIG. 3. Test file 112 may include a unique identifier (ID) 114.

FIG. 2 is a block diagram of an example electronic appliance suitable for implementing disclosed methods, in accordance with one example embodiment of the invention. Electronic appliance 200 is intended to represent any of a wide variety of traditional and non-traditional electronic appliances, laptops, desktops, cell phones, wireless communication subscriber units, wireless communication telephony infrastructure elements, personal digital assistants, set-top boxes, or any electric appliance that would benefit from the teachings of the present invention. In accordance with the illustrated example embodiment, electronic appliance 200 may include one or more of processor(s) 202, memory controller 204, system memory 206, input/output controller 208, network controller 210, input/output device(s) 212, solid state disk 214, bus 216 and trim agent 218 coupled as shown in FIG. 2. In one embodiment, solid state disk 214 includes flash memory, such as filesystem memory 100. In one embodiment, trim agent 218 generates temporary file 110 and test file 112 as part of a method for trimming data on non-volatile flash media, as described in greater detail with reference to FIG. 3.

Processor(s) 202 may represent any of a wide variety of control logic including, but not limited to one or more of a microprocessor, a programmable logic device (PLD), programmable logic array (PLA), application specific integrated circuit (ASIC), a microcontroller, and the like, although the present invention is not limited in this respect. In one embodiment, processors(s) 202 are Intel® compatible processors. Processor(s) 202 may have an instruction set containing a plurality of machine level instructions that may be invoked, for example by an application or operating system.

Memory controller 204 may represent any type of chipset or control logic that interfaces system memory 206 with the other components of electronic appliance 200. In one embodiment, the connection between processor(s) 202 and memory controller 204 may be a point-to-point serial link. In another embodiment, memory controller 204 may be referred to as a north bridge.

System memory 206 may represent any type of memory device(s) used to store data and instructions that may have been or will be used by processor(s) 202. Typically, though the invention is not limited in this respect, system memory 206 will consist of dynamic random access memory (DRAM). In one embodiment, system memory 206 may consist of Rambus DRAM (RDRAM). In another embodiment, system memory 206 may consist of double data rate synchronous DRAM (DDRSDRAM).

Input/output (I/O) controller 208 may represent any type of chipset or control logic that interfaces I/O device(s) 212 with the other components of electronic appliance 200. In one embodiment, I/O controller 208 may be referred to as a south bridge. In another embodiment, I/O controller 208 may comply with the Peripheral Component Interconnect (PCI) Express™ Base Specification, Revision 1.0a, PCI Special Interest Group, released Apr. 15, 2003.

Network controller 210 may represent any type of device that allows electronic appliance 200 to communicate with other electronic appliances or devices. In one embodiment, network controller 210 may comply with a The Institute of Electrical and Electronics Engineers, Inc. (IEEE) 802.11b standard (approved Sep. 16, 1999, supplement to ANSI/IEEE Std 802.11, 1999 Edition). In another embodiment, network controller 210 may be an Ethernet network interface card.

Input/output (I/O) device(s) 212 may represent any type of device, peripheral or component that provides input to or processes output from electronic appliance 200.

Bus 216 is shown as coupling solid state disk 214 with I/O controller 208, however solid state disk 214 may be coupled to other components of electronic appliance 200. In one embodiment, bus 216 represents a Serial Advanced Technology Attachment (SATA) bus.

While shown as being part of solid state disk 214, trim agent 218 may be incorporated into another component of electronic appliance 200, such as I/O controller 208, for example. In one embodiment, trim agent 218 may be software or a combination of software and hardware. In one embodiment, trim agent 218 represents an operating system (OS) application that runs in user mode.

FIG. 3 is a flow chart of an example method for trimming data on non-volatile flash media, in accordance with one example embodiment of the invention. It will be readily apparent to those of ordinary skill in the art that although the following operations may be described as a sequential process, many of the operations may in fact be performed in parallel or concurrently. In addition, the order of the operations may be re-arranged without departing from the spirit of embodiments of the invention.

In one embodiment, method 300 begins with confirming (302) the logical memory blocks 102 of filesystem memory 100 are not remapped. In one example embodiment, test file 112 is created containing ID 114. Test file 112 is then written to filesystem memory 100. The specific filesystem logical blocks 102 that test file 112 occupies are then determined and the raw contents of the corresponding SSD logical blocks (or the last block) are read to determine if ID 114 was stored as written without remapping. In one embodiment, this confirmation step is performed once to ensure method 300 wouldn't inadvertently trim the wrong logical block addresses (LBA's) and possibly active data in the case of remapping, for example RAID. In other embodiments, this step may be skipped or accomplished in other ways.

Next is allocating (304) temporary file 110 to occupy free space of filesystem memory 100. In one embodiment, temporary file 110 is allocated to substantially all of deleted filesystem blocks 106 and unallocated filesystem blocks 108. In another embodiment, an amount of free space on filesystem memory 100 is determined, for example by querying an OS. In one embodiment, temporary file 110 is allocated exclusive rights to the free space on filesystem memory 100.

Method 300 continues with determining (306) specific logical blocks of filesystem memory 100 that temporary file 110 occupies. In one embodiment, a partition manager query is generated to return the volume offsets and filesystem clusters that temporary file 100 occupies.

Next is generating (308) trim commands for the specific blocks. In one example embodiment, trim commands are generated in a user-mode applet in the absence of OS awareness or support for TRIM. In one embodiment, the trim commands are passed directly to filesystem memory 100 via ATA pass-through.

Then, method 300 may conclude with deleting (310) temporary file 110 to make the space available to the file system after the space was cleared from the medium. Method 300 may be performed intermittently or on a regularly reoccurring schedule.

Figure 4:
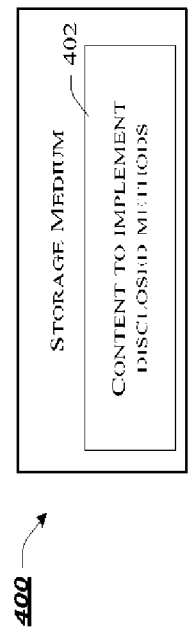
FIG. 4 is a block diagram of an example article of manufacture including content which, when accessed by a device, causes the device to implement one or more aspects of one or more embodiment(s) of the invention.

FIG. 4 illustrates a block diagram of an example storage medium comprising content which, when accessed, causes an electronic appliance to implement one or more aspects of the disclosed method 300. In this regard, storage medium 400 includes content 402 (e.g., instructions, data, or any combination thereof) which, when executed, causes the appliance to implement one or more aspects of methods described above.

The machine-readable (storage) medium 400 may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem, radio or network connection).

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Embodiments of the present invention may be used in a variety of applications. Although the present invention is not limited in this respect, the invention disclosed herein may be used in microcontrollers, general-purpose microprocessors, Digital Signal Processors (DSPs), Reduced Instruction-Set Computing (RISC), Complex Instruction-Set Computing (CISC), among other electronic components. However, it should be understood that the scope of the present invention is not limited to these examples.

Embodiments of the present invention may also be included in integrated circuit blocks referred to as core memory, cache memory, or other types of memory that store electronic instructions to be executed by the microprocessor or store data that may be used in arithmetic operations. In general, an embodiment using multistage domino logic in accordance with the claimed subject matter may provide a benefit to microprocessors, and in particular, may be incorporated into an address decoder for a memory device. Note that the embodiments may be integrated into radio systems or hand-held portable devices, especially when devices depend on reduced power consumption. Thus, laptop computers, cellular radiotelephone communication systems, two-way radio communication systems, one-way pagers, two-way pagers, personal communication systems (PCS), personal digital assistants (PDA's), cameras and other products are intended to be included within the scope of the present invention.

The present invention includes various operations. The operations of the present invention may be performed by hardware components, or may be embodied in machine-executable content (e.g., instructions), which may be used to cause a general-purpose or special-purpose processor or logic circuits programmed with the instructions to perform the operations. Alternatively, the operations may be performed by a combination of hardware and software. Moreover, although the invention has been described in the context of a computing appliance, those skilled in the art will appreciate that such functionality may well be embodied in any of number of alternate embodiments such as, for example, integrated within a communication appliance (e.g., a cellular telephone).

Many of the methods are described in their most basic form but operations can be added to or deleted from any of the methods and information can be added or subtracted from any of the described messages without departing from the basic scope of the present invention. Any number of variations of the inventive concept is anticipated within the scope and spirit of the present invention. In this regard, the particular illustrated example embodiments are not provided to limit the invention but merely to illustrate it. Thus, the scope of the present invention is not to be determined by the specific examples provided above but only by the plain language of the following claims.

What is claimed is:

1. A non-transitory storage medium comprising content which, when executed by an accessing machine, causes the accessing machine to:
   allocate a temporary file that occupies free space in a filesystem;
   determine logical block addresses (LBA's) of the filesystem that the temporary file occupies;
   generate TRIM commands for the specific LBA's;
   confirm the filesystem is not remapping LBA's, the content for confirming that the files system is not remapping LBA's further comprising content to:
      create a test file containing a unique identifier;
      write the test file to the filesystem;
      determine specific blocks in the filesystem that the test file occupies; and
      read raw contents from at least one flash memory block to determine if the unique identifier was stored without remapping; and
   delete the temporary file.

2. The non-transitory storage medium of claim 1, wherein the filesystem comprises NAND flash memory.

3. The non-transitory storage medium of claim 2, wherein the NAND flash memory comprises a solid state disk.

4. The non-transitory storage medium of claim 2, wherein the NAND flash memory comprises a hard disk drive cache.

5. The non-transitory storage medium of claim 1, wherein the content to determine LBA's of the filesystem that the temporary file occupies comprises content to query a partition manager for volume offsets and filesystem clusters the temporary file occupies.

6. The non-transitory storage medium of claim 1, wherein the content to allocate a temporary file that occupies free space in a filesystem comprises content to: determine an amount of free space in the filesystem; and allocate an exclusive rights file that occupies substantially all of the free space in the filesystem.

7. A system comprising:
   a processor;
   a network controller; and
   a storage device, wherein the storage device includes a flash memory and a trim engine, the trim engine to:
      allocate a temporary file that occupies free space on a flash memory;
      determine specific blocks of the flash memory that the temporary file occupies;
      generate TRIM commands for the specific blocks;
      confirm that the flash memory logical block addresses are not remapped, further comprising directing the trim engine to:
         create a test the containing a unique identifier;
         write the test file to the flash memory;
         determine specific blocks of flash memory that the test file occupies; and
         read raw contents from at least one flash memory block to determine if the unique identifier was stored without remapping;
      and
      delete the temporary file.

8. The system of claim 7, wherein the flash memory comprises NAND flash memory.

9. The system of claim 7, wherein the trim engine to determine specific blocks of the flash memory that the temporary file occupies comprises the trim engine to query a partition manager for volume offsets and filesystem clusters the temporary file occupies.

10. The system of claim 7, wherein the trim engine to allocate a temporary file that occupies free space on a flash memory comprises the trim engine to: determine an amount of free space on the flash memory; and allocate an exclusive rights file that occupies substantially all of the free space on the flash memory.

11. A method comprising:
   allocating a temporary file that occupies free space in a filesystem;
   determining specific logical block addresses (LBA's) of a solid state drive (SSD) that the temporary file occupies;
   generating TRIM commands for the specific LBA's;
   confirming the filesystem LBA's are not remapped, further comprising:
      creatin a test containing a unique identifier;
      writing the test file to the flash memory;
      determining specific blocks of flash memory that the test file occupies; and
      reading raw contents from at least one flash memory block to determine if the unique identifier was stored without remapping and
   deleting the temporary file.

12. The method of claim 11, wherein determining specific LBA's of the SSD that the temporary file occupies comprises querying a partition manager for volume offsets and filesystem clusters the temporary file occupies.

13. The method of claim 11, wherein allocating a temporary file that occupies free space in a filesystem comprises: determining an amount of free space in the filesystem; and allocating an exclusive rights file that occupies substantially all of the free space in the filesystem.

14. The method of claim 11, wherein the filesystem comprises NAND flash memory.

* * * * *